US007422362B2

(12) United States Patent   (10) Patent No.: US 7,422,362 B2
Sands                        (45) Date of Patent: *Sep. 9, 2008

(54) PORTABLE BLENDER

(75) Inventor: Lenny Sands, Encino, CA (US)

(73) Assignee: Homeland Housewares, LLC, Los Angeles, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 11/395,977

(22) Filed: Mar. 31, 2006

(65) Prior Publication Data

US 2006/0176770 A1   Aug. 10, 2006

Related U.S. Application Data

(63) Continuation-in-part of application No. 10/824,531, filed on Apr. 13, 2004, now Pat. No. 7,066,640, which is a continuation-in-part of application No. 10/649,757, filed on Aug. 26, 2003, now Pat. No. 6,817,750.

(51) Int. Cl.
A47J 43/046 (2006.01)
A47J 43/06 (2006.01)

(52) U.S. Cl. .................................... 366/205; 366/314

(58) Field of Classification Search ................ 366/199, 366/205, 206, 307, 314; 241/282.1, 282.2; 222/480, 565; 215/329; 220/288; 99/348, 99/513

See application file for complete search history.

(56) References Cited

U.S. PATENT DOCUMENTS 1,480,914 A * 1/1924 Poplawski .................. 366/314
2,299,730 A * 10/1942 Bornstein ................... 220/718
2,304,476 A * 12/1942 Poplawski ............... 241/282.2
2,530,455 A   11/1950 Forss
RE24,607 E   2/1959 Seyfried
2,975,946 A * 3/1961 Westgate .................... 222/480
3,064,949 A   11/1962 Dewenter
3,085,710 A * 4/1963 McIlroy ..................... 220/711

(Continued)

FOREIGN PATENT DOCUMENTS

CN        322076       9/2003

(Continued)

OTHER PUBLICATIONS

S. Korean advertisement, Jun. 22, 2000, II jin Binics Co., Ltd., p. 11 picture.

Primary Examiner—Charles E Cooley
(74) Attorney, Agent, or Firm—Cislo & Thomas, LLP

(57) ABSTRACT

A portable blender system and method involving a mixing base that is capable of agitating the contents of a container. The base includes a structure for rotating a shaft, a recessed well positioned at a top of the mixing base, a pressure-actuated switch positioned about the periphery of the recessed well, a locking groove, and a portable power source. A container may have an opening at one end and a floor at a second end, wherein the base is tapered. The container includes locking members and in a spaced relation about a periphery of the container. The container may also include a handle that is externally coupled. The container also includes a ring that is selectively attachable and removable from the periphery of the opening such that, when the ring is coupled to the container, the user is able to drink from the container without spilling or dripping.

13 Claims, 13 Drawing Sheets

U.S. PATENT DOCUMENTS

| | | | | |
|---|---|---|---|---|
| 3,101,857 | A * | 8/1963 | Freedman | 215/396 |
| 3,315,946 | A | 4/1967 | Nissman | |
| 3,504,816 | A | 4/1970 | Weichsel | |
| 3,612,126 | A * | 10/1971 | Emmons et al. | 241/199.12 |
| 3,704,864 | A * | 12/1972 | Lee | 366/205 |
| 3,881,705 | A * | 5/1975 | Greenspan | 241/282.2 |
| 3,970,258 | A | 7/1976 | Mantelet | |
| 4,087,053 | A * | 5/1978 | Voglesonger | 241/282.1 |
| 4,111,372 | A | 9/1978 | Hicks et al. | |
| 4,233,891 | A * | 11/1980 | Schindler et al. | 99/348 |
| D260,350 | S | 8/1981 | Kahlcke | |
| 4,480,926 | A | 11/1984 | Lattery, Jr. et al. | |
| 4,487,509 | A * | 12/1984 | Boyce | 366/199 |
| D281,945 | S * | 12/1985 | Boyce | D7/378 |
| 4,708,487 | A * | 11/1987 | Marshall | 366/206 |
| 4,714,203 | A | 12/1987 | Williams | |
| 4,723,719 | A * | 2/1988 | Williams | 241/282.2 |
| 4,889,248 | A * | 12/1989 | Bennett | 215/390 |
| 4,961,521 | A * | 10/1990 | Eckman | 222/142.5 |
| 5,323,973 | A * | 6/1994 | Ferrara, Jr. | 241/37.5 |
| 5,500,967 | A * | 3/1996 | Wilson et al. | 8/158 |
| 5,639,161 | A * | 6/1997 | Sirianni | 366/314 |
| 5,662,032 | A * | 9/1997 | Baratta | 99/513 |
| 5,680,968 | A * | 10/1997 | Moore | 222/480 |
| 5,690,021 | A * | 11/1997 | Grey | 99/513 |
| 5,720,552 | A * | 2/1998 | Schindlegger | 366/197 |
| 5,863,118 | A | 1/1999 | Ackels et al. | |
| 5,882,113 | A * | 3/1999 | Binder | 366/146 |
| 5,911,504 | A * | 6/1999 | Schindlegger, Jr. | 366/197 |
| 6,065,861 | A * | 5/2000 | Chen | 366/144 |
| 6,116,469 | A * | 9/2000 | Wallays et al. | 222/148 |
| 6,135,019 | A * | 10/2000 | Chou | 99/513 |
| 6,193,407 | B1 | 2/2001 | Kubicz | |
| 6,223,652 | B1 * | 5/2001 | Calia et al. | 99/513 |
| D445,634 | S | 7/2001 | Feil | |
| D446,995 | S | 8/2001 | Porsche et al. | |
| D470,050 | S * | 2/2003 | Renz et al. | D9/434 |
| D487,668 | S * | 3/2004 | Sands | D7/378 |
| 6,758,592 | B2 * | 7/2004 | Wulf et al. | 366/205 |
| 6,786,440 | B2 * | 9/2004 | Ling et al. | 241/301 |
| 6,796,705 | B1 * | 9/2004 | Khubani | 366/197 |
| 6,817,750 | B1 * | 11/2004 | Sands | 366/205 |
| D499,603 | S | 12/2004 | Nikkhah | |
| D500,633 | S * | 1/2005 | Sands | D7/396.2 |
| D501,759 | S * | 2/2005 | Sands | D7/536 |
| D517,862 | S * | 3/2006 | Sands | D7/396.2 |
| D519,321 | S * | 4/2006 | Sands | D7/523 |
| D521,802 | S * | 5/2006 | Sands | D7/396.2 |
| 7,063,456 | B2 * | 6/2006 | Miller et al. | 366/205 |
| 7,066,640 | B2 * | 6/2006 | Sands | 366/205 |
| D532,255 | S * | 11/2006 | Sands | D7/413 |
| D532,648 | S * | 11/2006 | Sands | D7/376 |
| D536,216 | S * | 2/2007 | Sands | D7/507 |
| 7,267,478 | B2 * | 9/2007 | Miller et al. | 366/205 |
| 7,320,542 | B2 * | 1/2008 | Tai | 366/205 |
| 2001/0036124 | A1 * | 11/2001 | Rubenstein | 366/205 |
| 2002/0012288 | A1 * | 1/2002 | Masip et al. | 366/205 |
| 2003/0193833 | A1 * | 10/2003 | Wulf et al. | 366/142 |
| 2003/0213373 | A1 * | 11/2003 | Dickson, Jr. | 99/348 |
| 2003/0214875 | A1 * | 11/2003 | Dickson, Jr. | 366/206 |
| 2003/0230658 | A1 * | 12/2003 | Ling et al. | 241/282.1 |
| 2004/0173105 | A1 | 9/2004 | Kim et al. | |
| 2005/0047272 | A1 * | 3/2005 | Sands | 366/199 |
| 2005/0068846 | A1 * | 3/2005 | Wulf et al. | 366/199 |
| 2005/0068847 | A1 * | 3/2005 | Sands | 366/205 |
| 2005/0122837 | A1 | 6/2005 | Bravard et al. | |
| 2005/0185507 | A1 * | 8/2005 | Beesley et al. | 366/205 |
| 2005/0207270 | A1 * | 9/2005 | Beesley | 366/205 |
| 2005/0229795 | A1 | 10/2005 | Stuckey | |
| 2006/0007779 | A1 * | 1/2006 | Fernandez et al. | 366/206 |
| 2006/0120215 | A1 * | 6/2006 | Sands | 366/197 |
| 2006/0153003 | A1 * | 7/2006 | Sands | 366/205 |
| 2006/0176770 | A1 * | 8/2006 | Sands | 366/205 |
| 2006/0209627 | A1 * | 9/2006 | McGill | 366/205 |
| 2007/0183256 | A1 * | 8/2007 | Sands | 366/205 |

FOREIGN PATENT DOCUMENTS

| | | | |
|---|---|---|---|
| DE | 19602147 | A1 | 7/1997 |
| EP | 0562310 | A1 | 9/1993 |
| JP | 5-199943 | * | 8/1993 |
| JP | 5-199944 | | 8/1993 |
| JP | 6-319656 | | 11/1994 |
| JP | 9-65988 | | 3/1997 |
| JP | 10-117944 | | 5/1998 |
| JP | 11-137454 | | 5/1999 |
| JP | 2000-201837 | | 7/2000 |
| JP | 2000-201838 | | 7/2000 |
| JP | 2002-177155 | | 6/2002 |
| JP | 2002-291627 | | 10/2002 |
| JP | 2002-336139 | | 11/2002 |
| JP | 2003-259994 | * | 9/2003 |
| JP | 2003-259995 | | 9/2003 |
| JP | 2004-16693 | | 1/2004 |
| KR | 1999-0073275 | | 10/1999 |
| KR | 10-0263732 | * | 5/2000 |
| KR | 20-0202865 | * | 8/2000 |
| KR | 10-0323245 | * | 1/2002 |
| WO | WO 03/003888 | A1 | 1/2003 |
| WO | WO 03/005871 | A1 | 1/2003 |
| WO | WO 03/075726 | A1 | 9/2003 |

* cited by examiner

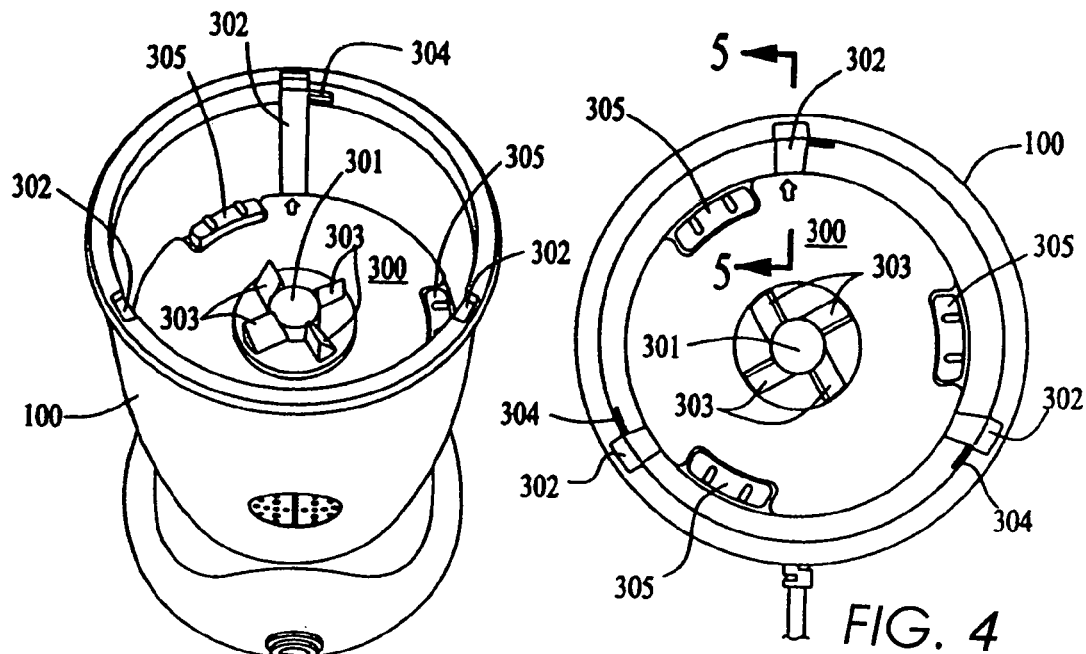
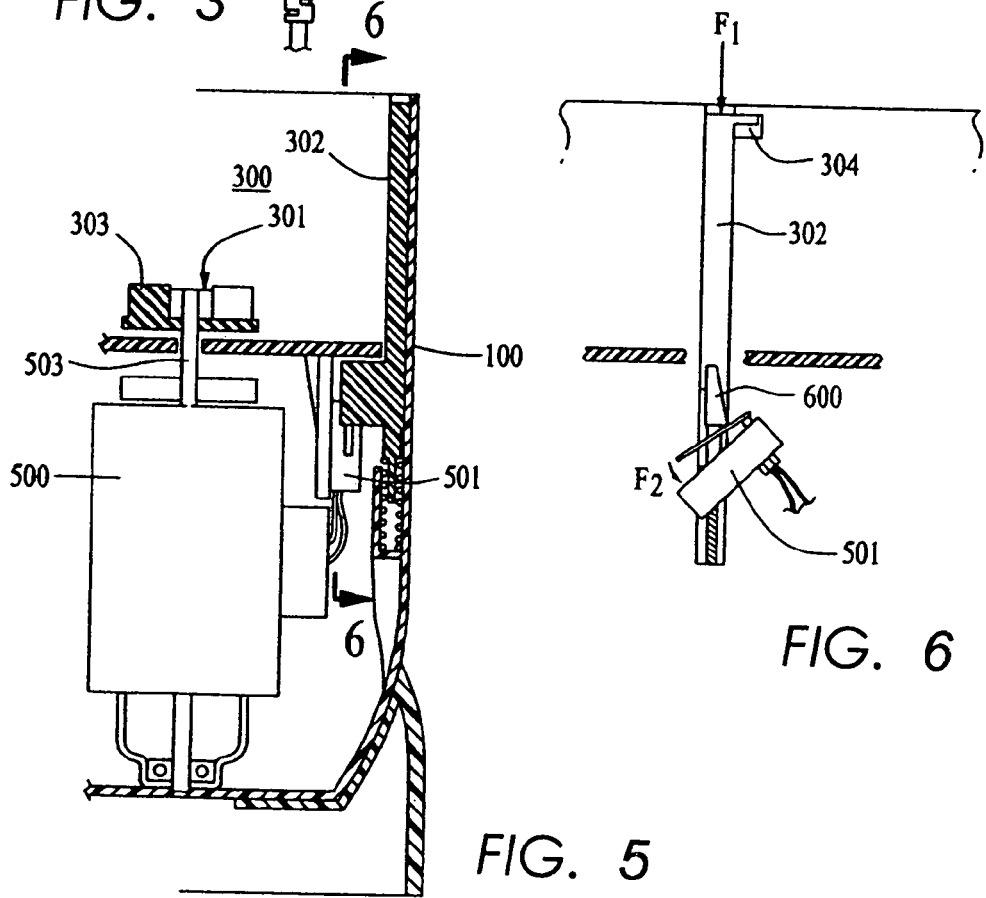
FIG. 3
FIG. 4
FIG. 5
FIG. 6

PORTABLE BLENDER

CROSS-REFERENCE TO RELATED APPLICATION(S)

This document is a continuation-in-part application of, that is related to, and claims priority through U.S. patent application Ser. No. 10/824,531, entitled "Blender and Mugs," filed on Apr. 13, 2004, now issued as U.S. Pat. No. 7,066,640 on Jun. 27, 2006, which is, in turn, a continuation-in-part application that is related to, and claims priority from U.S. patent application Ser. No. 10/649,757, entitled "Individualized Blender," filed on Aug. 26, 2003, and now issued as U.S. Pat. No. 6,817,750 on Nov. 6, 2004, all the subject matter of which are hereby incorporated by reference thereto in their entirety herein for all purposes.

TECHNICAL FIELD

The present invention generally technically relates to blenders. More particularly, the present invention technically relates to portable blenders. Even more particularly, the present invention technically relates to battery operated portable blenders.

BACKGROUND ART

Various devices for blending various liquids and solids have been developed over the years. These devices have various features and options to suit a wide variety of uses and applications. For example, many blenders exist that are either handheld devices or freestanding devices. While these devices have been useful, these related art devices can be difficult to clean, to use, and to store any unused products, especially, when blending smaller batches. More specifically, freestanding devices can be too large and cumbersome to use for making smaller portions and are generally better designed for blending larger quantities of fluids and ingredients. Handheld units may be useful to make individualized portions, but they may lack the power to properly blend the ingredients together. Furthermore, these handheld units are generally used with open containers, such as bowls or cups, which can increase the chances of spilling or splattering during preparation of the ingredients. Moreover, the unused portion would have to be poured out of the open container and into a sealable container to be stored or to be readily carried by a person. These related art blenders are also typically plugged into a wall socket for powering their motors which limits their use and the locations for such use. Accordingly, there a need is seen to exist for a portable blender system for facilitating its use, its cleaning, and storing of any unused products.

DISCLOSURE OF THE INVENTION

Exemplary embodiments disclosed here are directed to a portable blender system which may be either individualized, i.e., a single serving capacity, or may be of a larger scale, e.g., a multi-serving capacity. According to one exemplary embodiment, the blender system comprises a base including a motor, a container, and a combination blender and/or juicer canister. The base includes a body, the motor, an agitator coupled to the motor, a recessed well for receiving the container, and a pressure-sensitive switch that selectively powers the motor. In use, the container or canister is placed on the base, pressure is applied to the container or canister, thereby activating the motor, thereby activating the agitator, and thereby agitating the contents of the container or canister. The base also includes a locking groove that permits the user to lock the container or canister on the base while keeping the motor in the powered position. The base also includes a portable power source, such as at least one battery, for powering the motor. The portable power source may comprise at least one rechargeable battery. The portable blender may also comprise a battery recharger.

According to one exemplary embodiment, the individually sized container may be bullet-shaped. In alternate embodiments, the container may have a cylindrical, polygonal, cubical, or pyramidal shape. Also, the container may be sealed with a simple cap or a cap having an agitator. The container may also include a plurality of ridges that form a stable platform for standing the container in a position for use as a drinking vessel. In essence, the bullet-shape container may be inverted so that the container rests on the ridges; and the cap is readily accessible. Additionally, the container may include at least one locking member that engages at least one locking groove provided on the base. The base houses at least one battery which may be rechargeable.

According to one exemplary embodiment, the blender includes, at a minimum, a body, a selectively removable base having an agitator, at least one locking member that engages at least one locking groove provided on the base, and a selectively removable structure for sieving the container contents. In use, with the sieving structure provided in the body, fruits and vegetables may be placed and blended within the bore of the sieving structure. The pulp remaining from the fruits and vegetables remain within the bore of the sieving structure and the resultant juice may be decanted from the canister. Alternatively, the canister may be used without the sieving structure.

According to another embodiment, a container for use with a mixing base has an opening at one end and a floor at a second end, wherein the second end is tapered. The container may also include at least one locking member disposed in a spaced relation about the periphery of the container. The container may also include a staying structure coupled to its exterior. The container may also include a ring that is selectively attachable and removable from the periphery of the opening. When the ring is coupled to the container, the user is able to drink from the container without spilling or dripping.

Another embodiment is directed to caps that may be coupled to one or more of the containers herein disclosed. The cap may have a generally planar top surface and at least one sidewall. The cap may be secured over the openings of the container via at least one coupling structure. The cap may also include openings that are spaced about the top of the container. The openings may have varying sizes, shapes, and density in accordance with the intended or desired use.

BRIEF DESCRIPTION OF THE DRAWING(S)

For a better understanding of the present invention, reference is made to the below-referenced accompanying Drawing(s). Reference numbers refer to the same or equivalent parts of the present invention throughout the several figures of the Drawing(s).

FIG. 3 is a perspective view of an exemplary embodiment of a blender base, in accordance with the present invention.

FIG. 4 is a top plan view of the base as depicted in FIG. 3.

FIG. 5 is a cross-sectional view of an exemplary embodiment of the base, taken along line 5-5, as depicted in FIG. 4.

FIG. 6 is a cross-sectional view of an exemplary embodiment of a base, taken along line 6-6, as depicted in FIG. 5.

MODE(S) FOR CARRYING OUT THE INVENTION

The detailed description of the mode(s) for carrying out the invention, set forth below in connection with the appended Drawing(s). is intended as a description of the exemplary embodiments and is not intended to represent the only forms in which the exemplary embodiments may be constructed and/or utilized.

Figure 1:
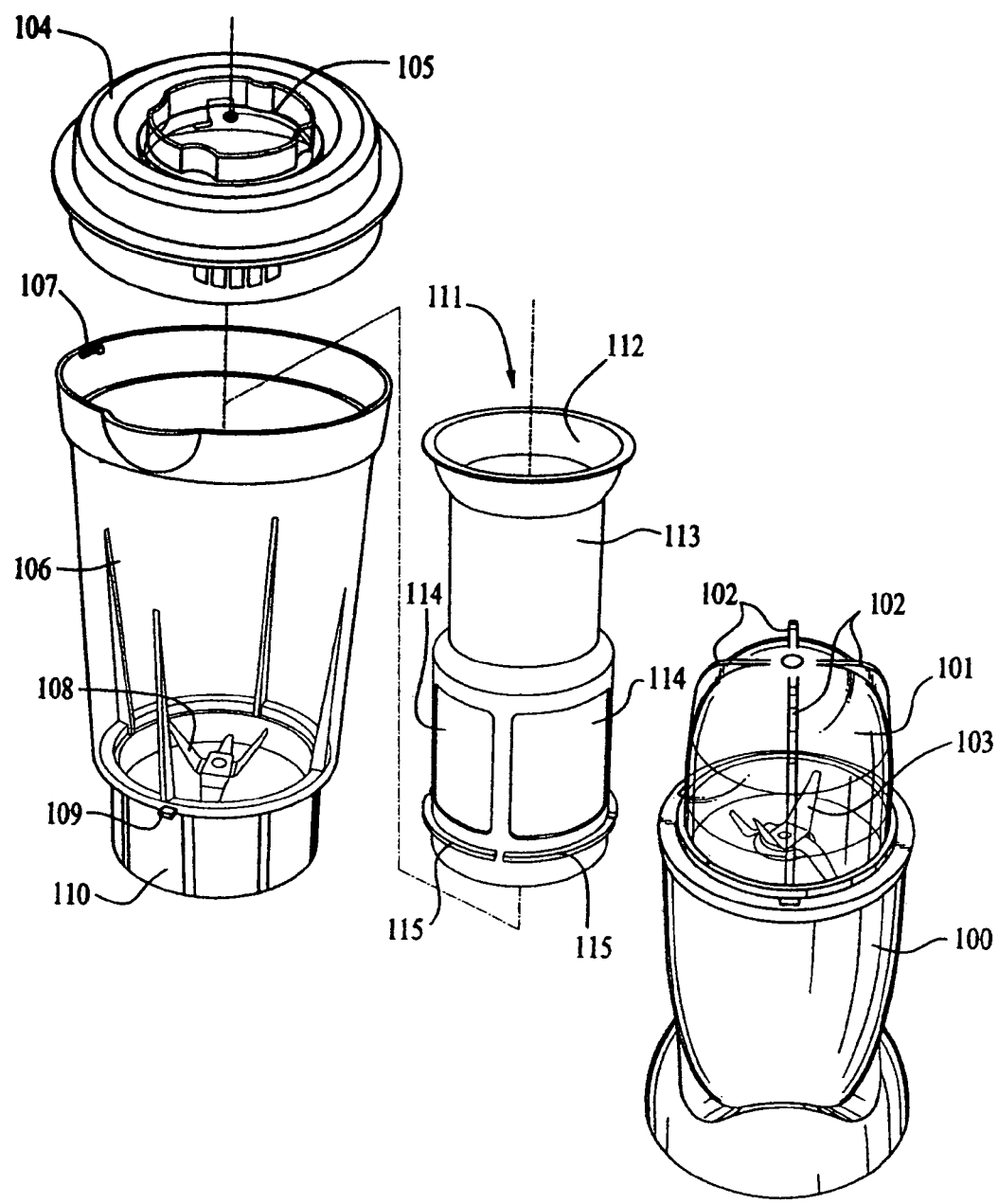
FIG. 1 is a perspective view of an exemplary embodiment of an individualized blender system, in accordance with the present invention.

FIG. 1 is directed to an exemplary embodiment of an individualized blender system, in accordance with the present invention. More specifically, FIG. 1 shows a container 101 engaged to a blender base 100 and a blender container 106. As shown in the exemplary embodiment of FIG. 1, the container 101 is a bullet-shaped container. The container 101 may have a plurality of shapes. Also, the container 101 may include a plurality of ridges 102 provided on the outer surface of the container 101. The container 101 also includes a structure for agitating 108 the contents of the container. The structure for agitating 108 the container contents can be a blade element coupled to an impeller in a shaft or other transmission structure. The blade element may have one, two, three, four, or more cutting elements. The cutting elements are generally flat members that may have sharpened edges, pointed tips, and one or more bends along the surface of the cutting elements.

The blender container 106 also includes a base 110, selectively removable lid 104, 105, and a base member 110 that is coupled to an agitating structure 108. As shown in FIG. 1, the lid is composed of two components; however, either a one-piece or a multi-piece cap is also contemplated in the present invention. The lid 104 may be locked onto the opening of the container 106 via a cap-locking member 107. The cap-locking member 107 may be an L-shaped ridge located at the lip of the container 106. The cap-locking member 107 engages a corresponding member (not shown) on the lid 104 in order to securely fix the lid 104 to the container 106.

According to one exemplary embodiment, the blender container 106 may include a juicer element 111. The juicer element 111 is composed of a main body 113 and a plurality of sieve elements 114 spaced about the periphery of the main body 113. According to the exemplary embodiment depicted in FIG. 1, the juicer element 111 may also include a funnel 112 disposed at one end of the main body 113. Additionally, the juicer element 111 may also include an annular stop member 115 positioned at one end of the juicer so as to prevent over-insertion of the juicer element 111 into the blender container 106.

Figure 2A:
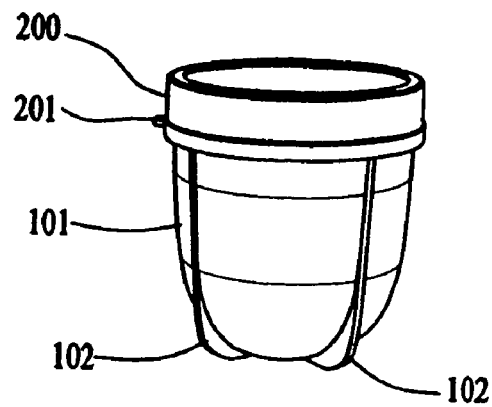
FIG. 2A is a perspective view of an exemplary embodiment of an individualized blender container, in accordance with the present invention.
Figure 2B:
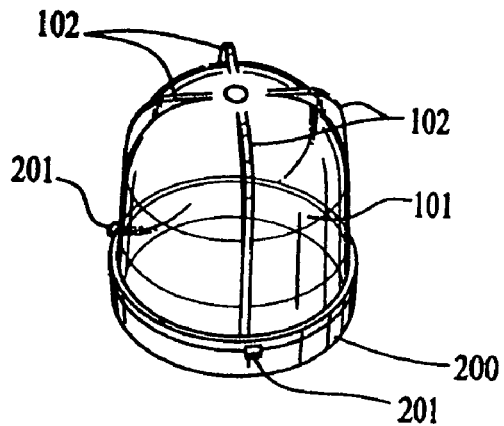
FIG. 2B is an exploded perspective view of the container as depicted in FIG. 2A.
Figure 2C:
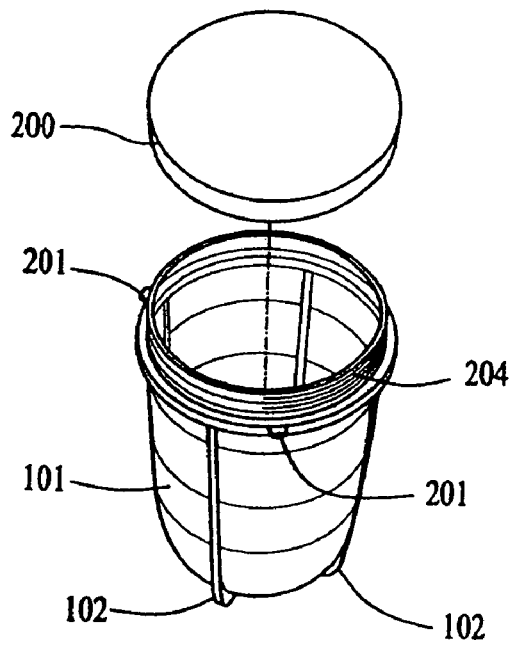
FIG. 2C is an inverted perspective view of the container as depicted in FIG. 2A.

FIGS. 2A through 2C illustrate various views of a container 101, in accordance with the present invention. That is, the container 101 is sized for smaller servings that would be prepared/consumed by one and/or a few individuals. Alternatively, the container 101 may be sized for a larger batch, e.g., multiple servings for several individuals. As shown in FIG. 2A, the container 101 is resting on external ridges 102. The external ridges 102 are shaped so as to permit the container 101 to rest on the apex of the container 101 without tipping over. The number of ridges 102 may be varied from what is depicted in FIG. 2A in a manner such that the container 101 can stand upright on a substantially flat surface. As shown in FIG. 2A, the container 101 may be used as a drinking vessel. That is, an individual may blend the contents of the container 101, remove the container 101 from the base 100, access the contents of the container, and secure the cap 200 onto the container 101 to store the remaining contents for later use.

Figure 2D:
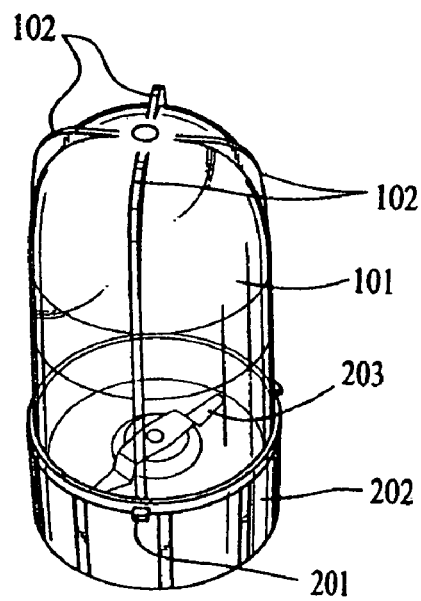
FIG. 2D is a perspective view of another exemplary embodiment of an individualized blender container, in accordance with the present invention.

In one configuration, the container 101 may be also enclosed with a cap 200. In an alternate configuration, the container 101 may be enclosed with a base 202 having an agitating structure or agitator 203 as shown in FIG. 2D. As shown in FIG. 2C, the cap 200 may be affixed to the opening of the container 101 by the threads 204. The cap 200 may be secured to the container 101 by a technique such as an interference fit, which includes, but not limited to, a compression fit, a friction fit, and a snap-fit. As shown in FIG. 2B, the container 101 is inverted and may rest on the cap 200.

FIG. 2D illustrates an alternate embodiment of the container 101 having a larger volume as compared to the embodiments depicted in FIGS. 2A-2C, in accordance with the present invention. Also, the base 202 includes another exemplary embodiment of an agitating structure or agitator 203. Additionally, as shown in FIGS. 2A through 2C, the container 101 includes the locking members 201 that are spaced about a periphery of the container 101. The locking members 201 allow the user to operate the blender without requiring the constant application of force to the container (in order to keep the motor switched in the "on" position).

FIG. 3 is directed to the base 100 and the various components that are associated with the base's recessed well 300, in accordance with the present invention. The base 100 includes a motor (not shown) that is coupled to an impeller 301. The impeller 301 includes a plurality of blades 303 that radiate from the center of the impeller 301. Along a periphery of the recessed well 300, a plurality of bushings 305 may be disposed about the periphery of the recessed well 300. In another exemplary embodiment of the base 100, the base 100 does not include the bushings 305. The bushings 305 may comprise a generally resilient material such as, but not limited to, rubber or silicone that may serve to reduce the vibrations during agitation. Also, as shown in FIG. 3, the recessed well 300 includes a plurality of pressure-activated switches 302. In use, the weight of the container 101 or the blender container 106 causes the downward movement of the switch 302 thereby activating the motor. As shown in FIG. 3, a locking groove 304 may be provided adjacent to the switch 302. Accordingly, in use, when the locking members 201 contact and depress the switch 302, the container 101, 106 may be rotated such that the locking member 201 engages the locking groove 304.

FIG. 4 illustrates, in a top view, the base 100, as depicted in FIG. 3; and FIG. 5 illustrates, in a cross-sectional view, the base 100, taken along line 5-5, as depicted in FIG. 4, in accordance with the present invention.

Referring to FIG. 6, a force $F_1$ is applied to the switch 302, whereby the switch 302 moves downward, in accordance with the present invention. This downward motion causes the cam 600 on the switch 302 to contact a switching structure 501 that is connected to the motor 500 thereby powering the motor. Accordingly, depending on the intended use or application, the container 101, 106 may be depressed to activate the motor 500 for short periods of time. Alternatively, the container 101, 106 may be depressed and rotated slightly so as to allow the locking members 201 to engage the locking groove 304 to permit the continued operation of the motor 500 without requiring the user to exert constant pressure to keep the motor powered.

Figures 7, 8, 9:
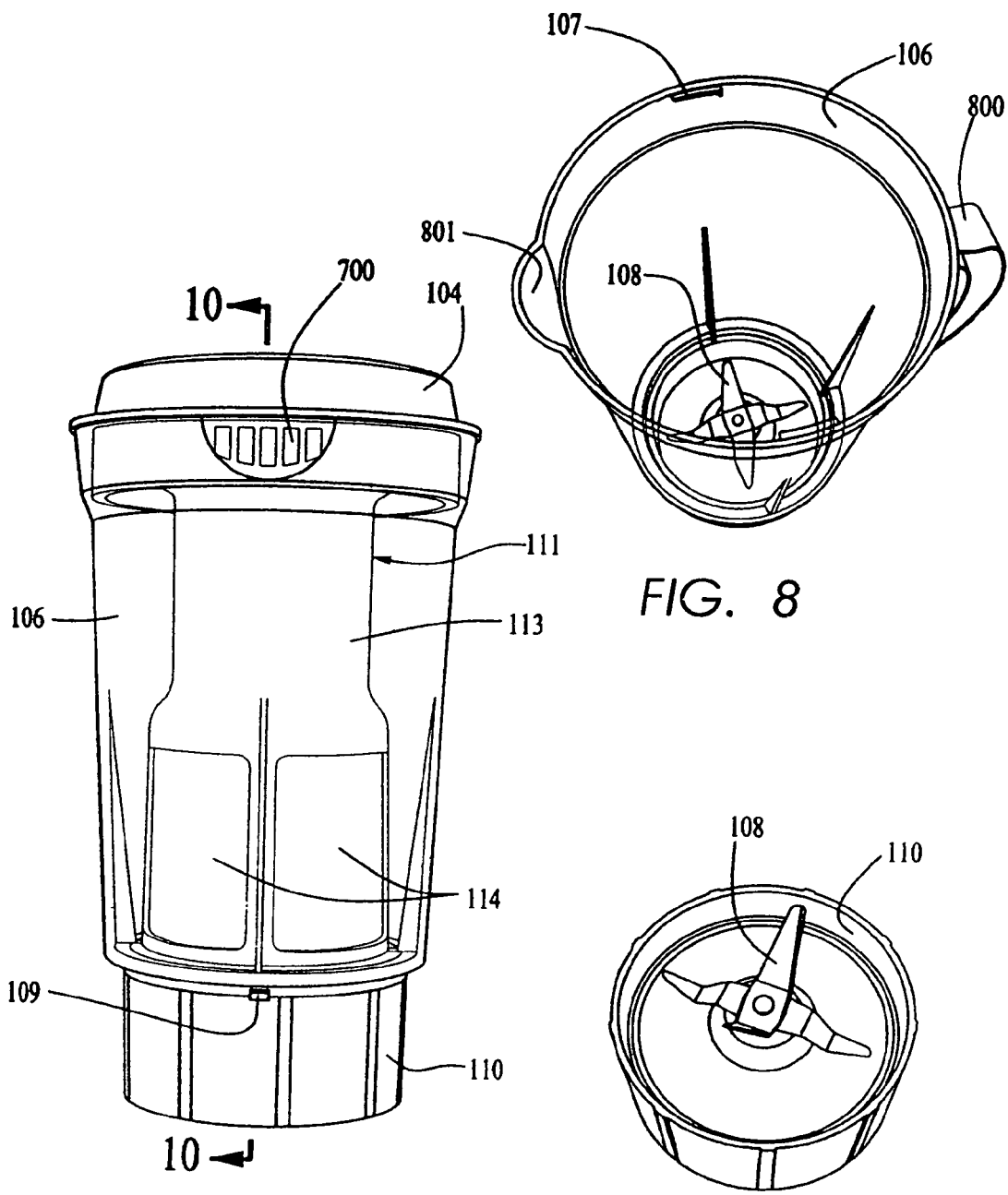
FIG. 7 is a side view of an exemplary embodiment of a blender container, in accordance with the present invention.
FIG. 8 is a perspective view of an exemplary embodiment of a blender container, in accordance with the present invention.
FIG. 9 is a perspective view of an exemplary embodiment of a blender container base, in accordance with the present invention.

FIG. 7 is directed to an exemplary embodiment of the blender container 106, in accordance with the present invention. The blender container 106 comprises a main body that defines a volume and a lid 104, 105 that is affixed thereto. The lid includes a plurality of openings 700 that may be used to decant the contents of the container 106 while the lid 104 remains affixed to the container 106. The blender container 106 also includes a base 110. The base 110 is sized to fit within the recessed well 300. Also, the base 110 is coupled to the container 106 by a screw-fit relation. The base 110 also includes an agitating structure 108, as shown in FIG. 9. Turning back to FIG. 7, the blender container 106 also includes a plurality of locking members 109 spaced about the periphery of the blender container 106 near the base 110 of the container 106. As shown in the exemplary blender container 106 depicted in FIG. 7, a juicer 111 may be provided within the body of the blender container 106. As those skilled in the art will appreciate, the blender container 106 may be used without the juicer 111. The blender container 106 may include a handle 800 and a spout 801 that facilitates the decanting of the contents of the container.

FIG. 8 illustrates, in a downward perspective view, the container 106, having the handle 800 and the spout 801, as depicted in FIG. 7; and FIG. 9 illustrates, in a downward perspective view, the base 110, having the agitator 108, as depicted in FIG. 8, in accordance with the present invention.

Figure 10:
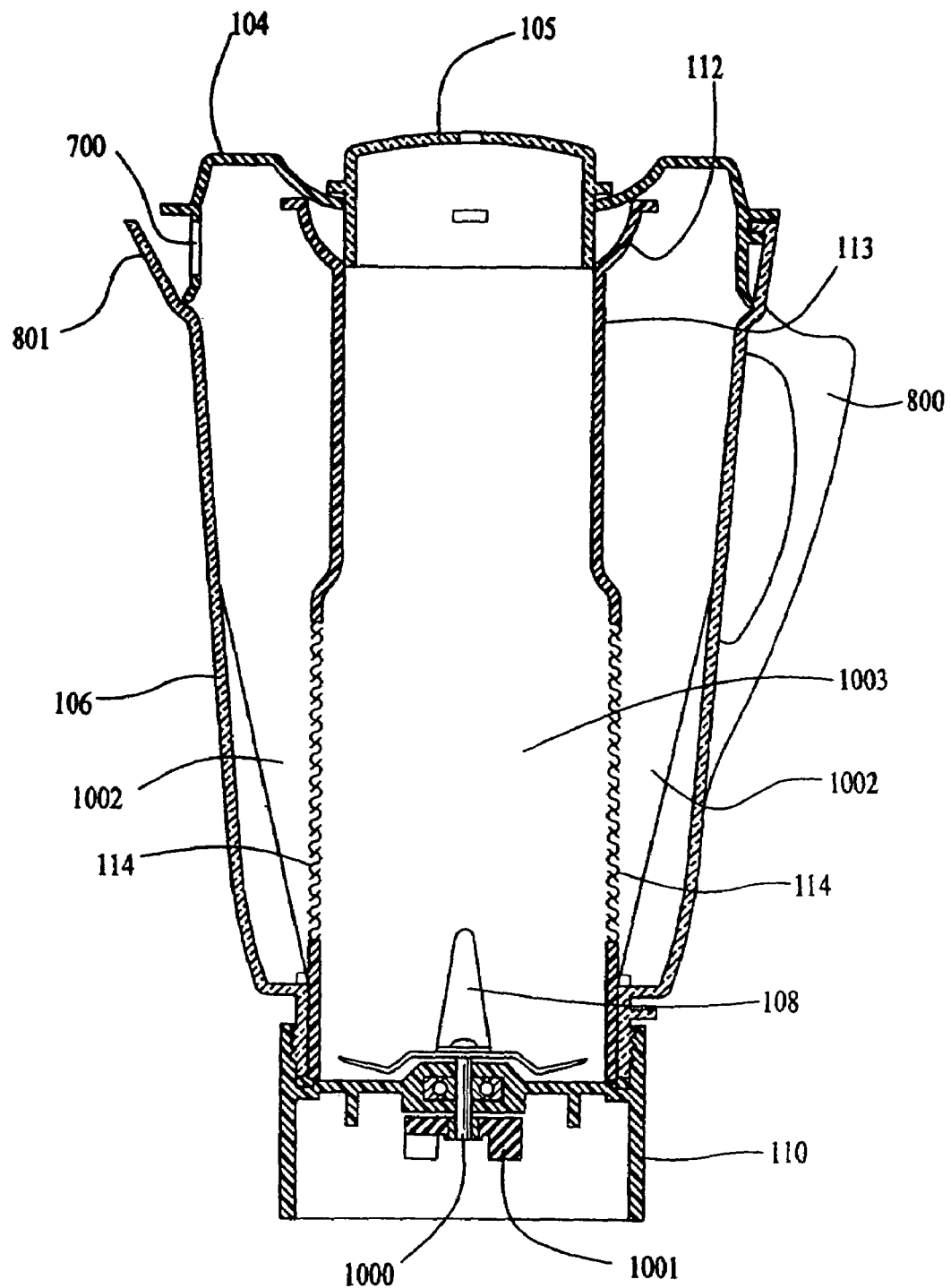
FIG. 10 is a cross-sectional view of an exemplary embodiment of the blender container, taken along line 10-10, as depicted in FIG. 7.

FIG. 10 illustrates, in a cross-sectional view, the blender container 106, in accordance with the present invention. The juicer element 111 is placed within the body of the blender container 106. As shown in FIG. 10, the juicer element 111 is secured to the bottom of the blender container 106. Additionally, the bore of the juicer 111 may be accessed by removing cap element 105. In use, fruits and/or vegetables may be placed into the bore 1003 of the juicer 111. Rotation of the motor is transmitted through shaft 1000 and mating impeller 1001, thereby transmitting a rotational force to the agitating structure 108. The contents of the juicer 1003 are then blended, thereby causing the resulting juice to move from the bore 1003 into the container body 1002 through the sieve elements 114. The remaining pulp is separated and trapped within the bore 1003 of the juicer 111. By providing a two-part cap 104, 105, an individual user can access the bore 1003 of the juicer 111 without removing the entire cap or stopping the machine for fear of spillage or splattering. For example, the individual user may remove the cap 105 to access the bore 1003 of the juicer 111 to add more products for juice extraction. The resulting juice that is located within the space 1002 may be decanted from the container without removing the lid through the openings.

Figure 11:
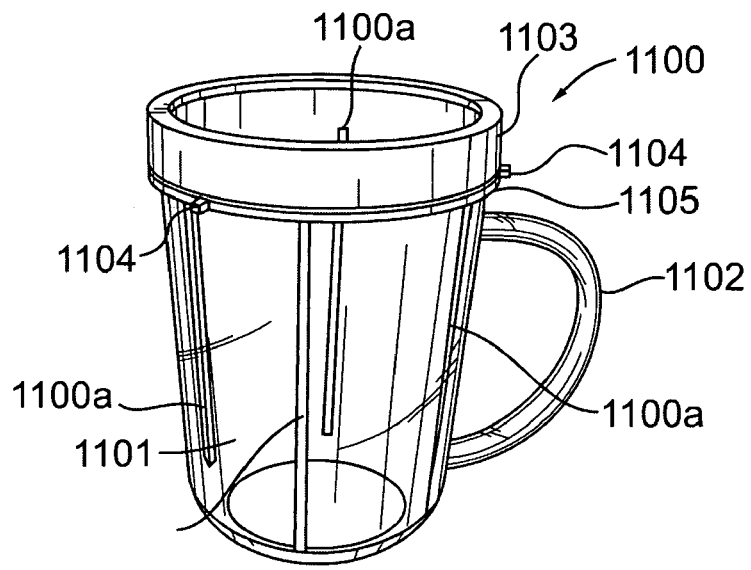
FIG. 11 is a perspective view of one embodiment of a mug that may be used with the blender, in accordance with the present invention

FIG. 11 illustrates one embodiment of a mug-type container 1100, in accordance with the present invention. The container 1100 includes at least one wall 1101 that defines a fluid containing area. As shown in the figure, the wall 1101 may be slightly tapered when moving from the mouth of the container 1100 to the base of the container 1100. The container 1100 also includes a structure for grasping or holding the container 1102. In another embodiment, the grasping structure may be a handle 1102, which is fixed to the outer wall 1101. In one embodiment, the handle 1102 is a generally U-shaped. In other exemplary embodiments, the handle 1102 may have an arcuate shape, a V-shape, or any other shape conducive to grasping.

The container 1100 also includes a plurality of locking members 1104 that are positioned about the periphery of the container 1100. In one embodiment, the locking members 1104 are protuberances that extend substantially perpendicular from the wall 1101 of the container 1100. Also as shown in FIG. 11, the members 1104 have a generally rectangular shape. The locking members 1104 may have a plurality of different shapes. The container 1100 may further comprise a plurality of interior ridges 1110a.

Figure 12:
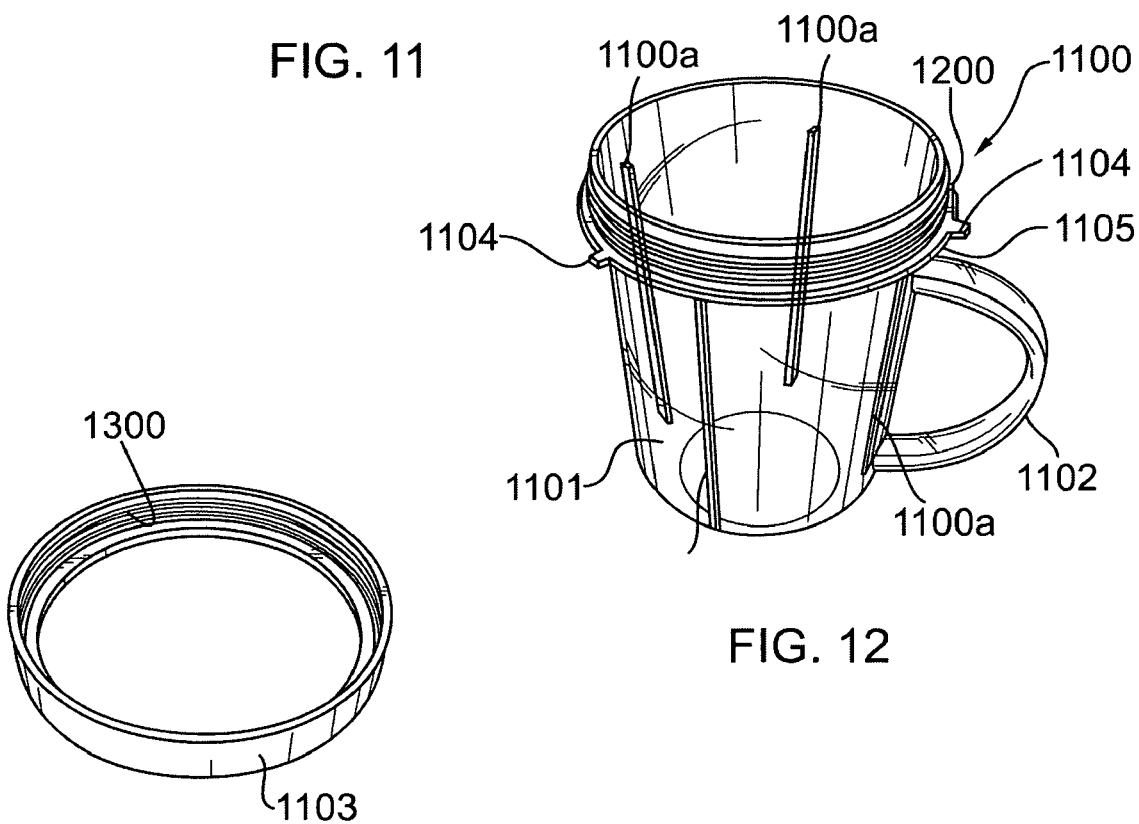
FIG. 12 is a perspective view of the embodiment of FIG. 11 with an exemplary embodiment of a ring removed from the mug.

As shown in FIG. 12, the container 1100 is provided with a plurality of threads 1200 on the outer wall 1101 that allow the ring 1103 to be coupled to the container 1100, in accordance with the present invention. As shown in the embodiment depicted in FIG. 11, the members 1104 may be coupled to a ring-shaped ridge 1105. The ridge 1105 may also serve as a stop so that the ring 1103 is not over threaded beyond the opening of the container 1100. The container 1100 may also include a ring 1103 that is positioned atop the mouth of the container 1100. The ring 1103 may be fixed to the container 1100 via threads or by other coupling structures.

Figure 13:
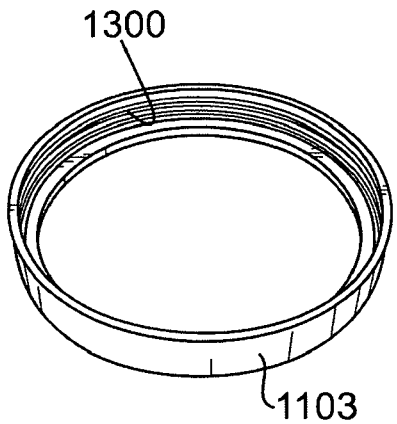
FIG. 13 is a bottom perspective view of the ring depicted in FIG. 12.

FIG. 13 shows one embodiment of the ring 1103 that may be coupled to the mouth of the container 1100, in accordance with the present invention. In one embodiment, the ring 1103 is a generally cylindrical wall having an outer surface and inner surface. The ring 1103 may include a plurality of threads 1300 that are found on the inner surface of the ring 1103. In another embodiment, the ring 1103 includes a top surface or a lip that is coupled to the wall of the ring 1300. The ring 1103 may be coupled over the threads 1200 of the container 1100 for facilitating drinking from the container 1100.

Figure 14:
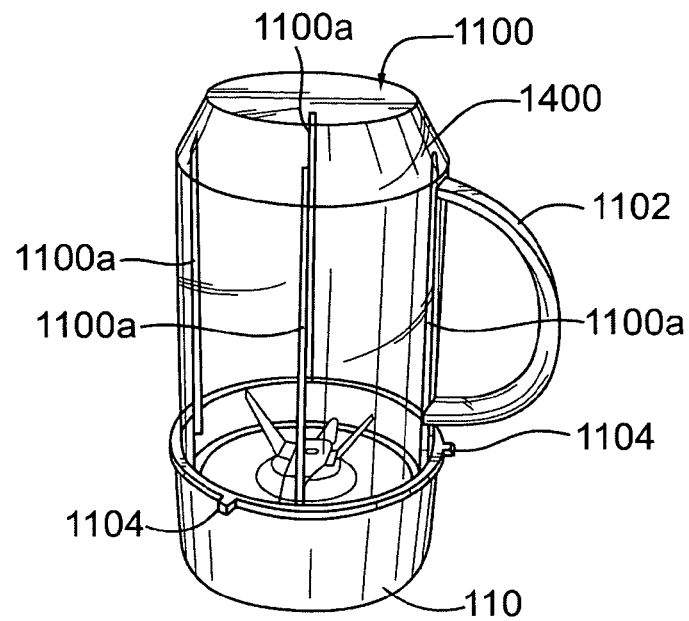
FIG. 14 is a perspective view of one embodiment of a mug that is coupled to a blender base, in accordance with the present invention.

FIG. 14 illustrates one exemplary embodiment of the container 1100 as fixed to a blender base 110, in accordance with the present invention. In one embodiment, the container 1100 is inverted and threadedly coupled to the blender base 110. The container 1100 may then be inserted into the recess well 300 of the blender base of a blender 100. As shown in FIG. 14, the "floor" of the container 1100 is slightly tapered or contoured. The floor taper or contour comprises a dome-like structure that facilitates blending.

Figure 15:
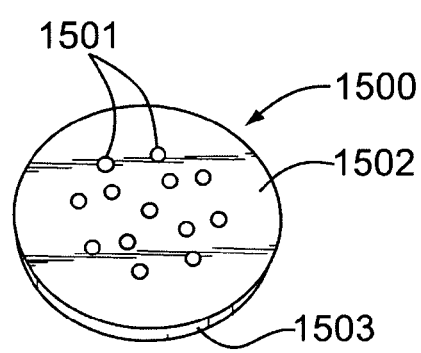
FIG. 15 is a perspective view of a top for a blender container, in accordance with the present invention.
Figure 16:
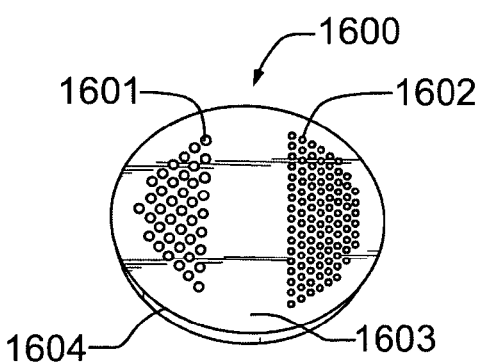
FIG. 16 is another embodiment of a top for a blender container, in accordance with the present invention.

FIGS. 15 and 16 illustrate exemplary embodiments of a container cap 1500, 1600, respectively, that may be coupled to a container 101, 1100, in accordance with the present invention. The cap 1500, 1600 contains a generally planar top surface 1502, 1103 and at least one sidewall 1503, 1604. According to various embodiments, the tops 1002, 1603 of the container cap 1500, 1600 and the sidewalls 1503, 1604 are generally perpendicular to one another. The caps 1500, 1600 may secure to the containers 101, 1100 by a coupling structure. In another embodiment, the coupling structure may comprise ridges for an interference fit, such as a compression fit, a friction fit, and a snap fit. In one embodiment, a plurality of threads (not shown) may be provided on the inner surface of the wall 1503, 1604. The threads are sized to engage the threads that are on the plurality of the containers 101, 1100 that are herein described.

As shown in FIG. 15, the container may include a plurality of openings 1501 that are spaced about the top of the container cap 1500. The openings 1501 may have varying sizes, shapes, and density on the cap 1500. As shown in FIGS. 15 and 16, these openings 1501, 1601, 1602 are generally circular in shape. The openings 1501, 1601, 1602 may have a plurality of different shapes. Furthermore, the clustering or density of the openings on the cap 1500, 1600 may be varied depending upon intended use of the container cap 1500, 1600. For instance, the cap 1500, as shown in FIG. 15, may be used for shaking out large or coarse items that are contained within the container 1500.

In FIG. 16, the openings 1601, 1602 being in closer proximity to each other may be useful for those blended items that have a smaller diameter or that may be poured or strained out of the container 1100, in accordance with the present invention.

Figure 17:
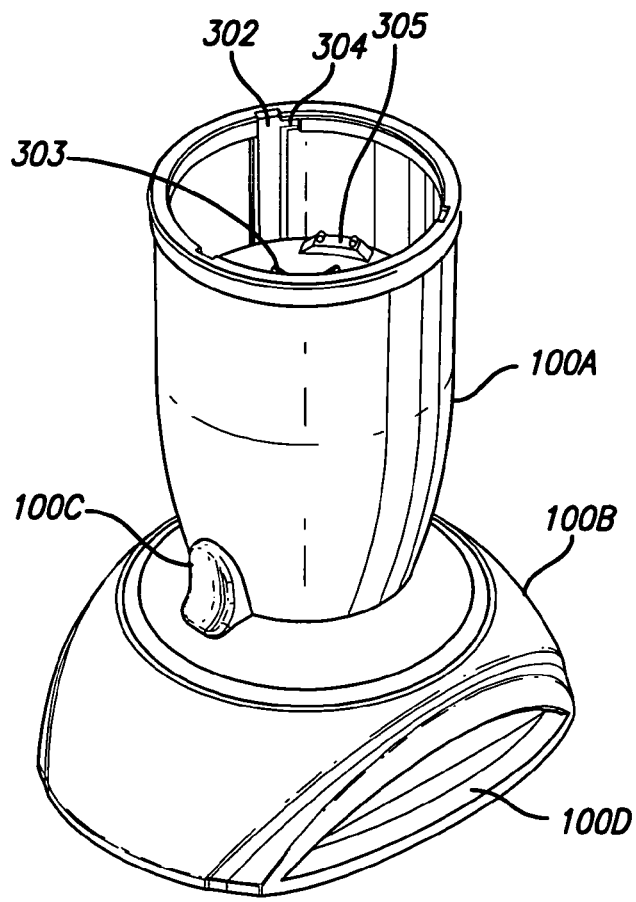
FIG. 17 is a downward perspective view of one embodiment of a portable blender, in accordance with the present invention.

FIG. 17 illustrates, in a downward perspective view, an alternative embodiment of a portable blender, comprising a base 100A and a base stand 100B, in accordance with the present invention. The base 100A is electrically as well as mechanically coupled to the base stand 100B. The base 100A is attachable to the base stand 100B by pressing the base 100A onto the base stand 100B. The base 100A also detachable, or quick-disconnectable, from the base stand 100B by activating a releasing structure 100C, wherein the releasing structure 100C may comprise a release button by example only. The base stand 100B comprises at least one setback 100D for facilitating holding by a user, e.g., during attachment of the base 100A to, and detachment from, the base stand 100B or during transportation of the portable blender from place to place.

Figure 18:
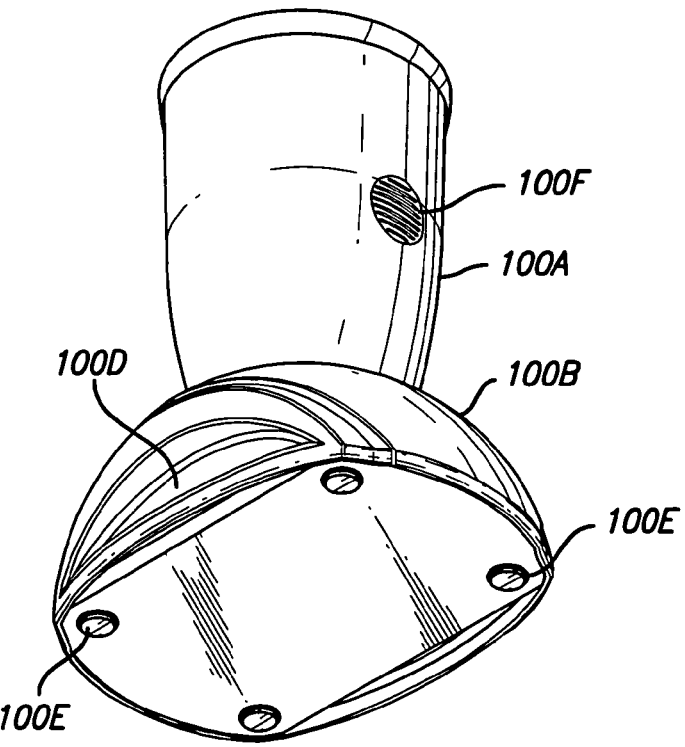
FIG. 18 is an upward perspective view of the portable blender, as depicted in FIG. 17.

FIG. 18 illustrates, an upward perspective view, the portable blender, as depicted in FIG. 17. The base stand 100B comprises at least one foot 100E for providing frictional stability as well as vibration absorbance. Also, the base 100A comprises a vent 100F for facilitating cooling of the motor therein housed.

Figure 19:
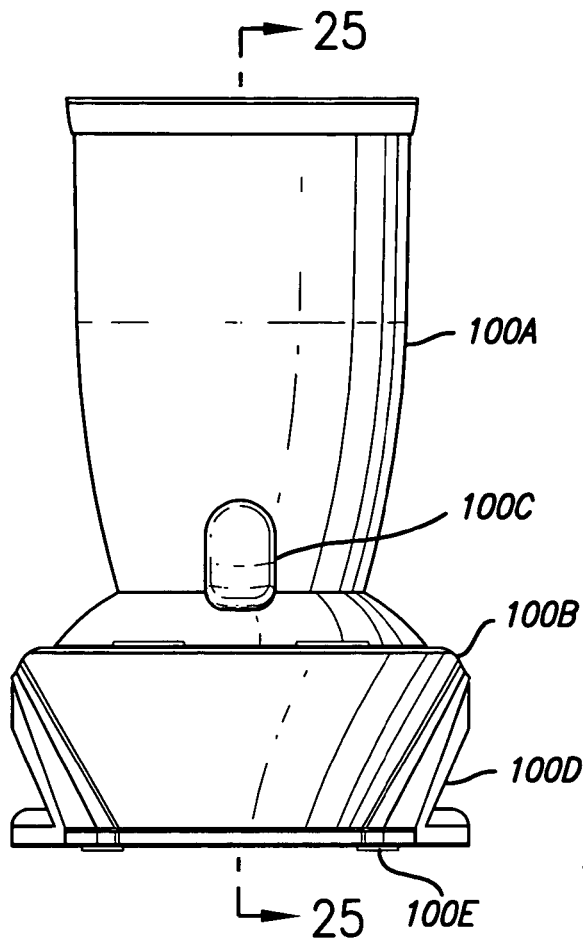
FIG. 19 is a front view of the portable blender, as depicted in FIG. 17.

FIG. 19 illustrates, in a front view, the base 100A and the base stand 100B of the portable blender, as depicted in FIG. 17.

Figure 20:
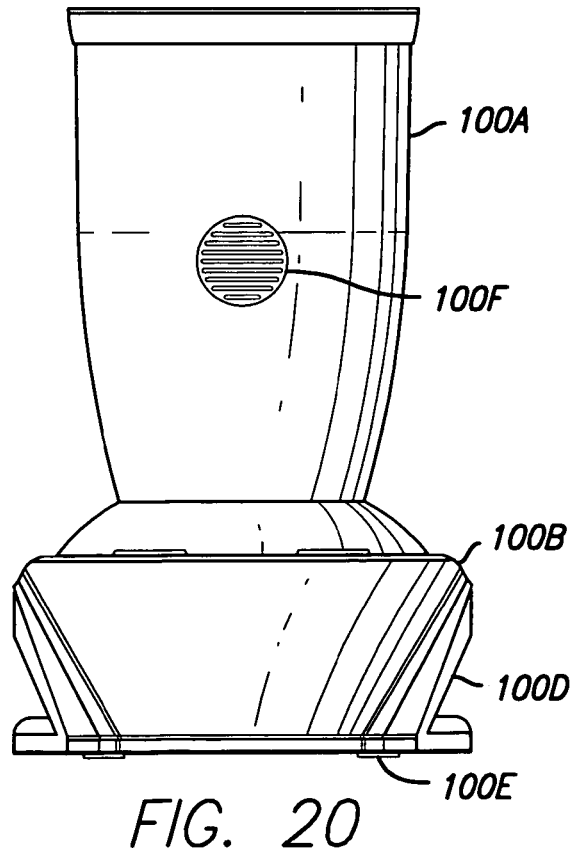
FIG. 20 is a rear view of the portable blender, as depicted in FIG. 18.

FIG. 20 illustrates, in a rear view, the base 100A and the base stand 100B of the portable blender, as depicted in FIG. 18.

Figure 21:
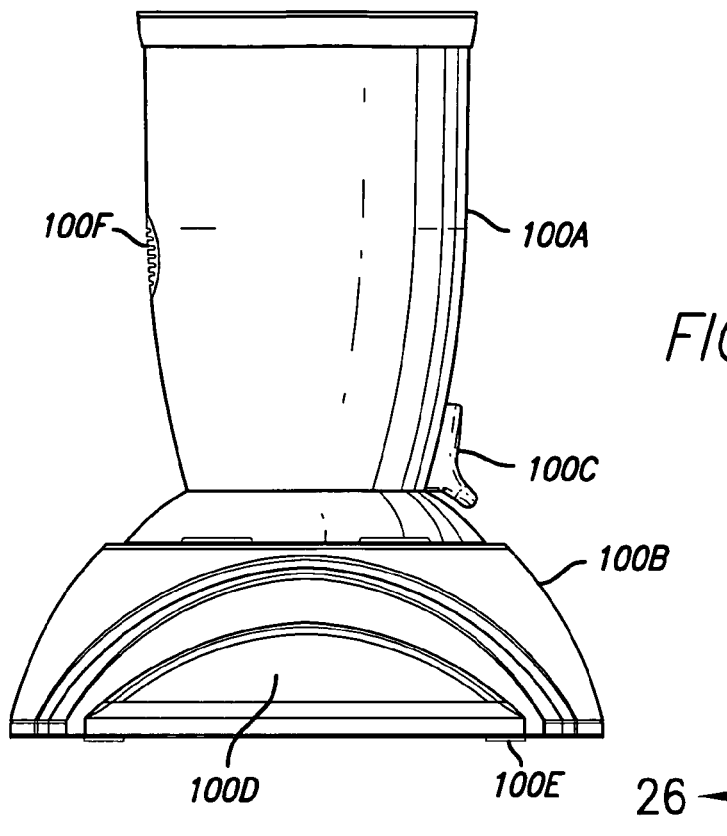
FIG. 21 is a side view of the portable blender, as depicted in FIG. 17.

FIG. 21 illustrates, in a side view, the base 100A and the base stand 100B of the portable blender, as depicted in FIG. 17.

Figure 22:
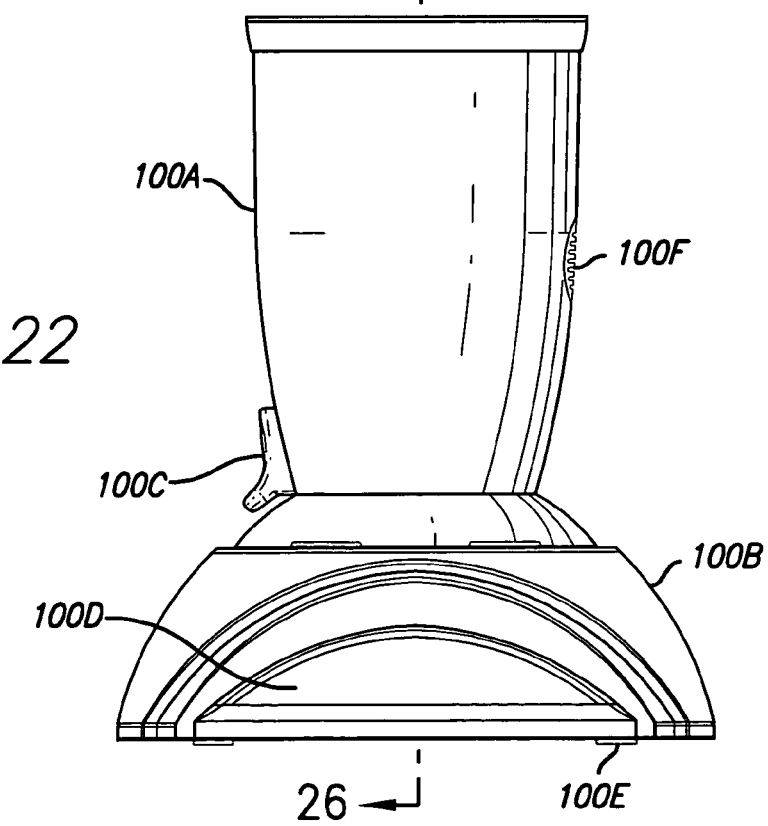
FIG. 22 is an opposing side view of the portable blender, as depicted in FIG. 17.

FIG. 22 illustrates, in an opposing side view, the base 100A and the base stand 100B of the portable blender, as depicted in FIG. 17.

Figure 23:
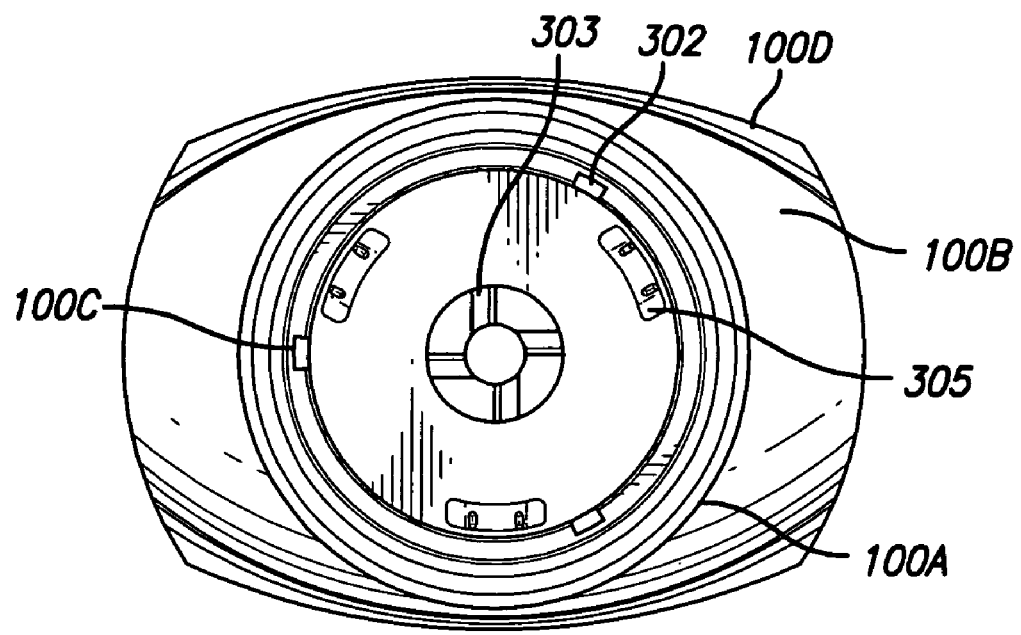
FIG. 23 is a top view of the portable blender, as depicted in FIG. 17.

FIG. 23 illustrates, in a top view, the base 100A and the base stand 100B of the portable blender, as depicted in FIG. 17.

Figure 24:
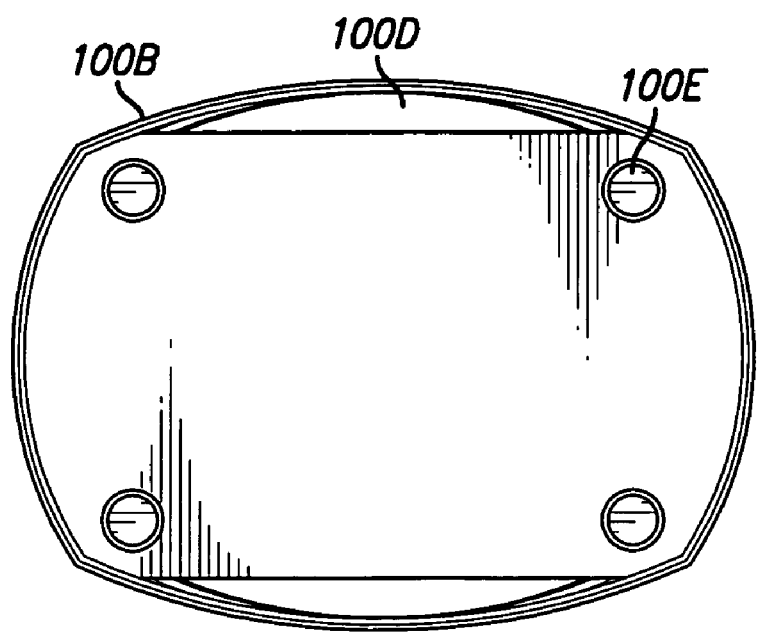
FIG. 24 is a bottom view of the base stand of the portable blender, as depicted in FIG. 17.

FIG. 24 illustrates, in a bottom view, the base 100A and the base stand 100B of the portable blender, as depicted in FIG. 17.

Figure 25:
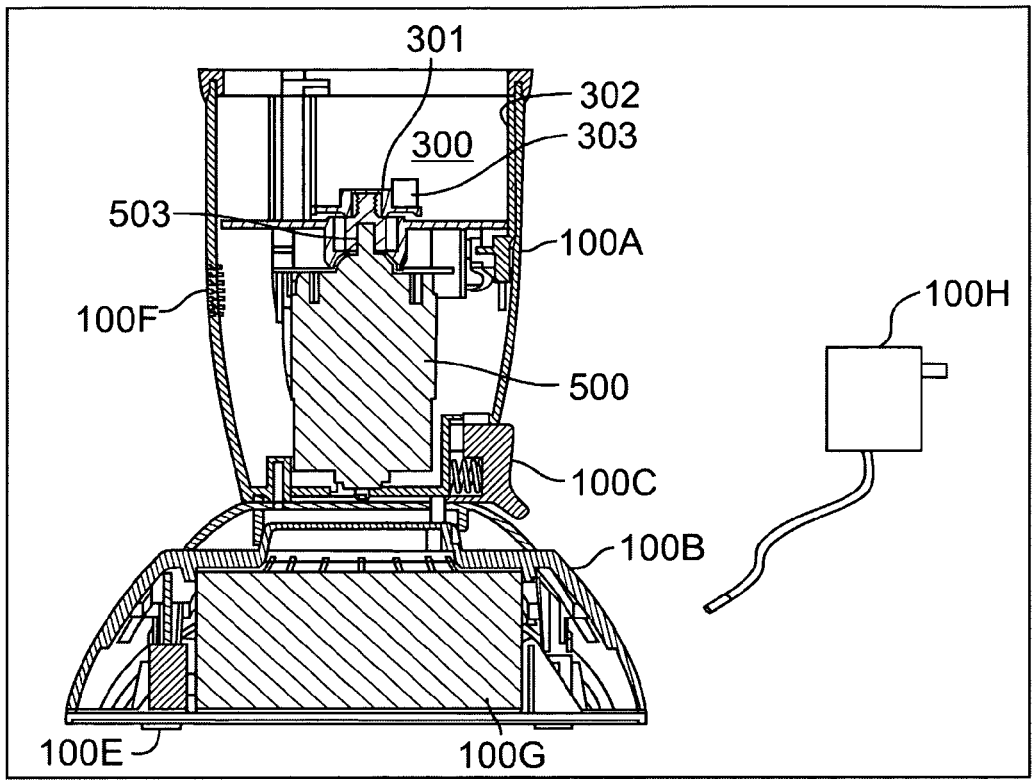
FIG. 25 is a side cross-sectional view of the portable blender, taken along line 25-25, as depicted in FIG. 19.

FIG. 25 illustrates, in a side cross-sectional view, the base 100A and the base stand 100B of the portable blender. The base 100B houses a portable power source 100G, e.g., at least one battery or at least one rechargeable battery. The individualized blender system may further comprise a recharger 100H for recharging the portable power source 100G.

Figure 26:
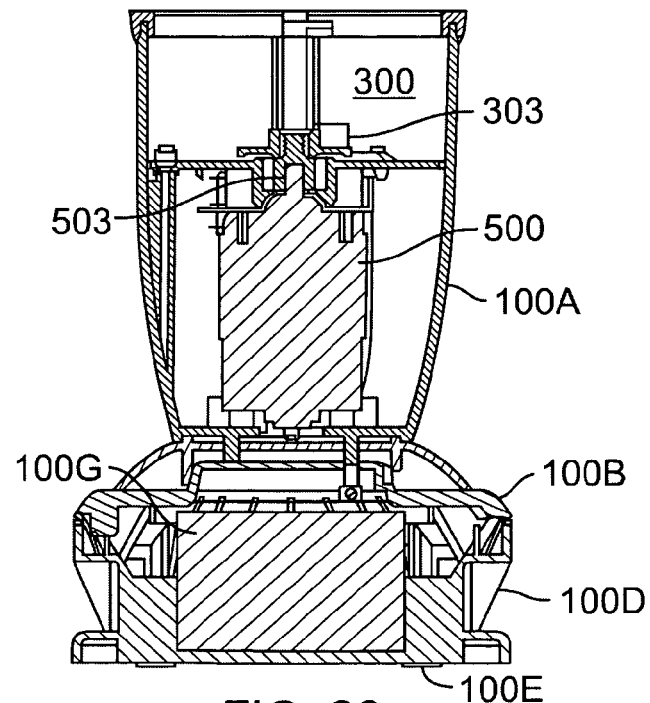
FIG. 26 is a front cross-sectional view of the portable blender, taken along line 26-26, as depicted in FIG. 22.

FIG. 26 illustrates, in a front cross-sectional view, the base 100A and the base stand 100B of the portable blender.

Figure 27:
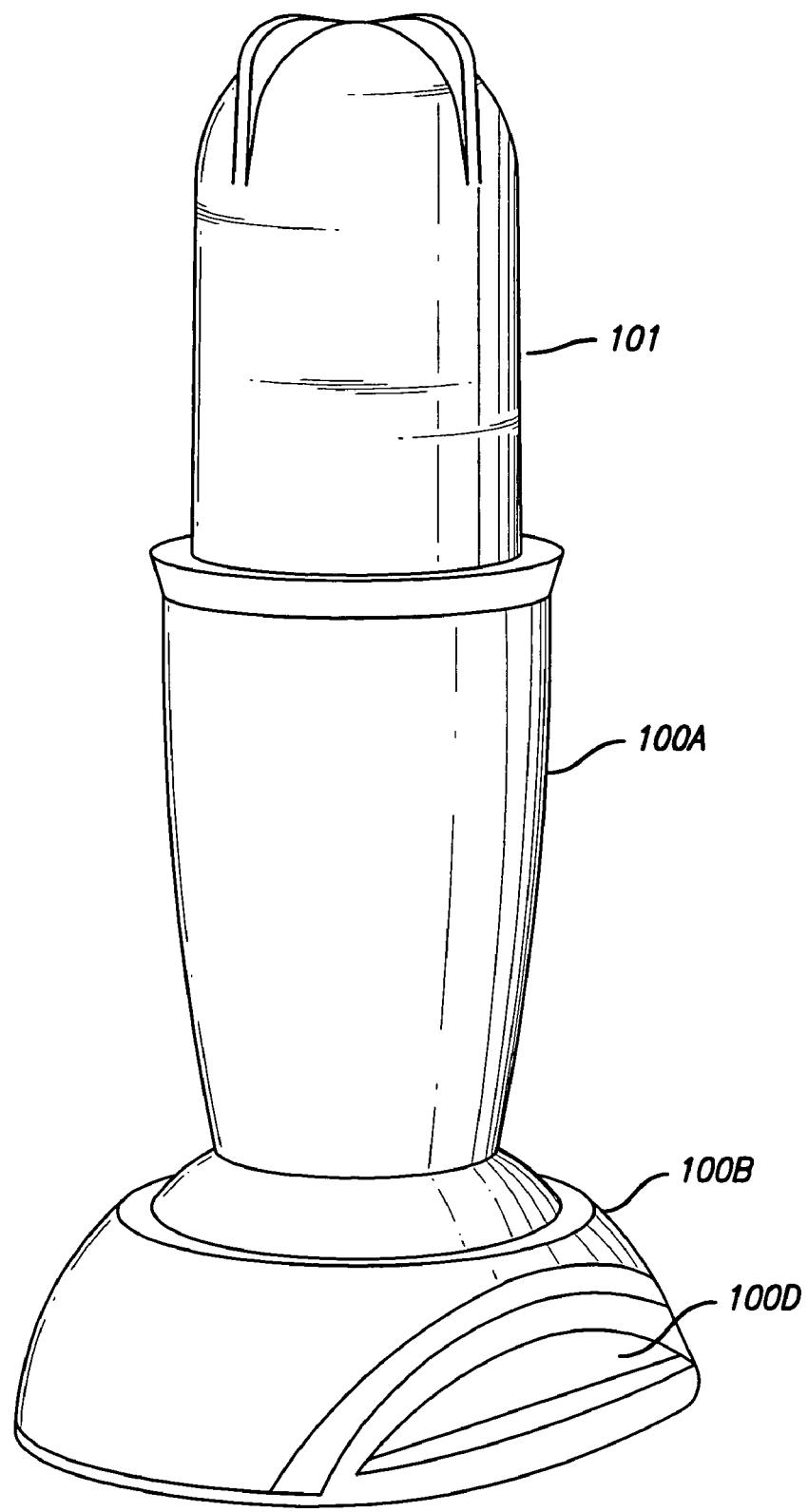
FIG. 27 is a perspective view of a portable blender having a container, in accordance with the present invention.

FIG. 27 illustrates, in a perspective view, a portable blender further comprising a container 101, in accordance with the present invention. The container 101 is attachable to, and detachable from, the base 100A by pressing, pressing with twisting, or in the manner as described in relation to FIG. 6, supra.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, various changes and modifications in form, material, and fabrication material detail may be made without departing from the spirit and scope of the inventions as set forth in the appended claims should be readily apparent to those of ordinary skill in the art. No claim herein is to be construed under the provisions of 35 U.S.C. § 112, sixth paragraph, unless the element is expressly recited using the phrase "means for."

INDUSTRIAL APPLICABILITY

The present invention generally industrially applies to blenders. More particularly, the present invention industrially applies to portable blenders. Even more particularly, the present invention industrially applies to battery operated portable blenders.

What is claimed:

1. A portable blender system, comprising:
a base comprising: means for rotating a shaft, a recessed well positioned at a top of the base; a pressure-actuated switch positioned about a periphery of the recessed well; at least one locking groove; and a portable power source disposed within the base being electrically coupled to the rotating means;
a base stand for accommodating the base;
a container comprising: an opening at one end and a floor at a second end, the container being tapered at the second end; a handle coupled to an exterior of the container; at least one locking member in a spaced relation about a periphery of the opening, the at least one locking member being respectively engageable with the at least one locking groove;
a ring selectively attachable and removable from a periphery of the opening;
means for agitating a content of the container, the agitating means being selectively attachable and removable from the opening of the container; and
a recharger for recharging the portable power source,
wherein the base comprises means for releasing the base from the base stand,
wherein the releasing means comprises a release button,
wherein the base comprises a vent for facilitating cooling of the rotating means,
wherein the base stand has a bottom surface and further comprises at least one foot disposed on the bottom surface,
wherein the base stand further comprises at least one setback disposed on at least one side of the base for facilitating holding by a user, and
wherein the portable power source comprises at least one element selected from a group consisting essentially of at least one battery and at least one rechargeable battery.

2. A system, as recited in claim 1, further comprising: a lid having a generally planar top and a wall coupled to a periphery of the top, the top having a plurality of openings, wherein the lid is selectively attachable and removable from the opening of the container.

3. A system, as recited in claim 1, wherein the container further comprises at least one thread positioned on the periphery of the opening.

4. A system, as recited in claim 3, wherein the ring comprises at least one wall and a lip coupled to a top of the at least one wall.

5. A system, as recited in claim 1, wherein the container further comprises at least one ridge positioned on an interior of the container.

6. A system, as recited in claim 1, wherein the agitating means comprises a mixer base and at least one blade being rotatably coupled to the mixer base.

7. A portable blender system, comprising: a base comprising: means for rotating a shaft, a recessed well positioned at a top of the base; a pressure-actuated switch positioned about a periphery of the recessed well; at least one locking groove; and a portable power source disposed within the base being electrically coupled to the rotating means;
a base stand for accommodating the base;
a container comprising: an opening at one end and a floor at a second end, the container being tapered at the second end; a handle coupled to an exterior of the container; at least one locking member in a spaced relation about a periphery of the opening, the at least one locking member being respectively engageable with the at least one locking groove; and at least one container thread being positioned about a periphery of the opening;
a ring comprising at least one ring wall and a lip, the lip coupled to a top of the at least one ring wall, the ring wall having at least one thread positioned on an interior portion the ring wall, the at least one ring thread being selectively attachable and removable from the container threads;
means for agitating a content of the container, the agitating means being selectively attachable and removable from the at least one container thread;
a lid having a generally planar top and a lid wall coupled to a periphery of the top, the top having a plurality of openings, and wherein the lid is selectively attachable and removable from the container threads; and
a recharger for recharging the portable power source,
wherein the base comprises means for releasing the base from the base stand,
wherein the releasing means comprises a release button,
wherein the base comprises a vent for facilitating cooling of the rotating means,
wherein the base stand has a bottom surface and further comprises at least one foot disposed on the bottom surface,
wherein the base stand further comprises at least one setback disposed on at least one side of the base for facilitating holding by a user, and
wherein the portable power source comprises at least one element selected from a group consisting essentially of at least one battery and at least one rechargeable battery.

8. A system, as recited in claim 7, wherein the agitating means comprises a mixer base and at least one blade being rotatably coupled to the mixer base.

9. A system, as recited in claim 7, wherein the openings on the lid are positioned on a portion of the lid.

10. A system, as recited in claim 7, wherein the lid further comprises at least one thread positioned on an interior of the lid wall.

11. A system, as recited in claim 7, wherein the container further comprises at least one ridge positioned on an interior of the container.

12. A portable blender system, comprising:
a base comprising: means for rotating a shaft, a recessed well positioned at a top of the base; a pressure-actuated switch positioned about a periphery of the recessed well; and at least one locking groove;
a base stand for accommodating the base;
a portable power source disposed within the base stand being electrically coupled to the rotating means of the base;
a container comprising: an opening at one end and a floor at a second end, the container being tapered at the second end; a handle coupled to an exterior of the container; at least one locking member in a spaced relation about a periphery of the opening, the at least one locking member being respectively engageable with the at least one locking groove;

means for agitating a content of the container, the agitating means being selectively attachable and removable from the opening of the container; and a recharger for recharging the portable power source, wherein the base comprises means for releasing the base from the base stand, wherein the releasing means comprises a release button, wherein the base comprises a vent for facilitating cooling of the rotating means, wherein the base stand has a bottom surface and further comprises at least one foot disposed on the bottom surface, wherein the base stand further comprises at least one setback disposed on at least one side of the base for facilitating holding by a user, and wherein the portable power source comprises at least one element selected from a group consisting essentially of at least one battery and at least one rechargeable battery.

13. A method of fabricating a portable blender system, comprising:

providing a base comprising: means for rotating a shaft, a recessed well positioned at a top of the base; a pressure-actuated switch positioned about a periphery of the recessed well; and at least one locking groove;

providing a base stand for accommodating the base;

providing a portable power source disposed within the base stand being electrically coupled to the rotating means of the base;

providing a container comprising: an opening at one end and a floor at a second end, the container being tapered at the second end; a handle coupled to an exterior of the container; at least one locking member in a spaced relation about a periphery of the opening, the at least one locking member being respectively engageable with the at least one locking groove;

providing means for agitating a content of the container, the agitating means being selectively attachable and removable from the opening of the container; and providing a recharger for recharging the portable power source, wherein the base providing step comprises providing means for releasing the base from the base stand, wherein the releasing means providing step comprises providing a release button, wherein the base providing step comprises providing a vent for facilitating cooling of the rotating means, wherein the base stand providing step comprises providing a bottom surface and providing at least one foot disposed on the bottom surface, wherein the base stand providing step further comprises providing at least one setback disposed on at least one side of the base for facilitating holding by a user, and wherein the portable power source providing step comprises providing at least one element selected from a group consisting essentially of at least one battery and at least one rechargeable battery.

* * * * *